P. D. BREWSTER.
LIGHT SPLITTING DEVICE FOR COLOR PHOTOGRAPHY.
APPLICATION FILED SEPT. 2, 1916.

1,277,040.

Patented Aug. 27, 1918.
3 SHEETS—SHEET 1.

WITNESSES:

INVENTOR
P. D. Brewster
BY
his ATTORNEYS

P. D. BREWSTER.
LIGHT SPLITTING DEVICE FOR COLOR PHOTOGRAPHY.
APPLICATION FILED SEPT. 2, 1916.

1,277,040.
Patented Aug. 27, 1918.
3 SHEETS—SHEET 2.

Inventor
P. D. Brewster
By his Attorneys
Kerr, Page, Cooper & Hayward

P. D. BREWSTER.
LIGHT SPLITTING DEVICE FOR COLOR PHOTOGRAPHY.
APPLICATION FILED SEPT. 2, 1916.

1,277,040.

Patented Aug. 27, 1918.
3 SHEETS—SHEET 2.

UNITED STATES PATENT OFFICE.

PERCY D. BREWSTER, OF EAST ORANGE, NEW JERSEY, ASSIGNOR TO BREWSTER FILM CORPORATION, OF NEWARK, NEW JERSEY, A CORPORATION OF NEW YORK.

LIGHT-SPLITTING DEVICE FOR COLOR PHOTOGRAPHY.

1,277,040.   Specification of Letters Patent.   Patented Aug. 27, 1918.

Application filed September 2, 1916. Serial No. 118,122.

*To all whom it may concern:*

Be it known that I, PERCY D. BREWSTER, a citizen of the United States, residing at East Orange, in the county of Essex and State of New Jersey, have invented certain new and useful Improvements in Light-Splitting Devices for Color Photography, of which the following is a full, clear, and exact description.

My present invention relates to means of dividing the light rays projected by a lens into two or more groups for use primarily in color photography for securing separate simultaneous color records of the object to be photographed.

The object of my invention is, in general, to provide a method of projecting absolutely even images without distortion on the entire plate, and to provide means for accurately and easily securing any proportion of reflected and transmitted light, and for permitting easy cleaning.

Figure 1:
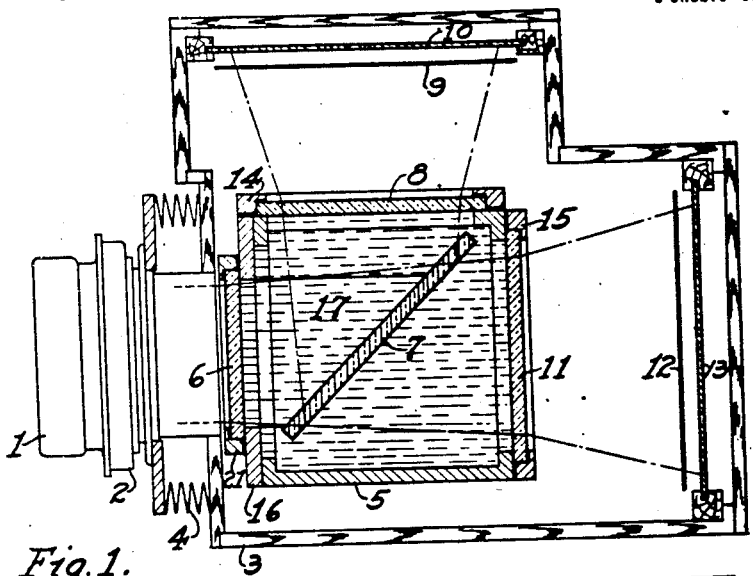
Figure 2:
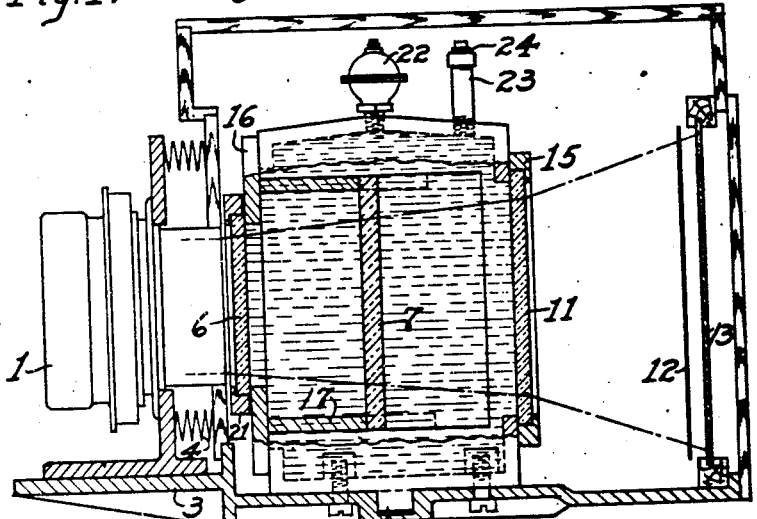
Figure 4:
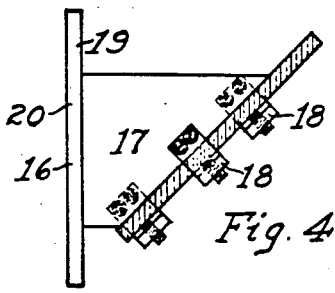
Figure 3:
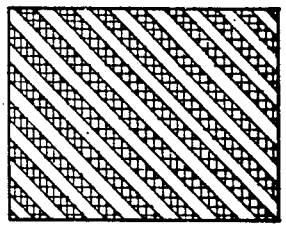
Figure 5:
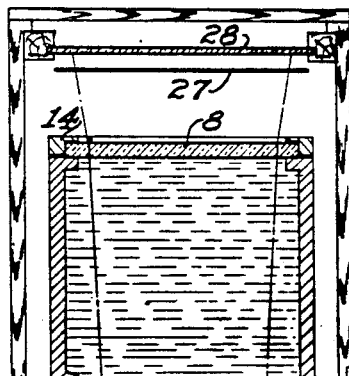
Figure 6:
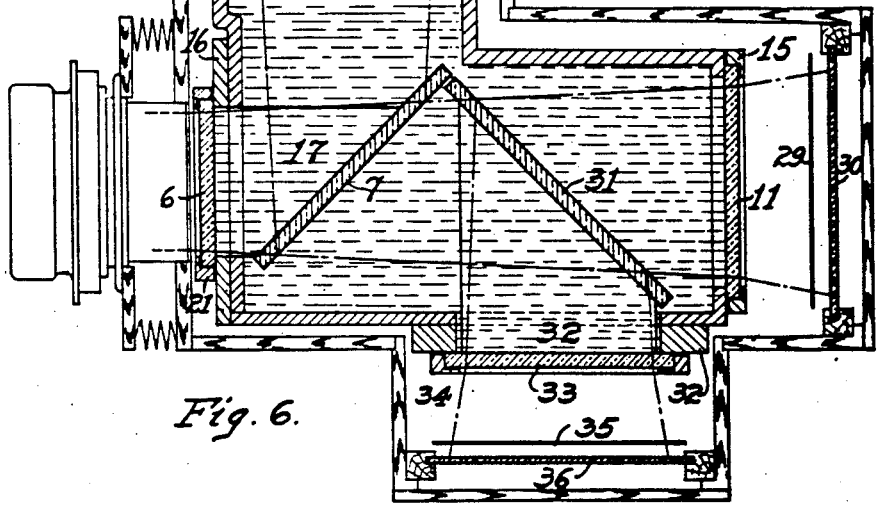
Figure 7:
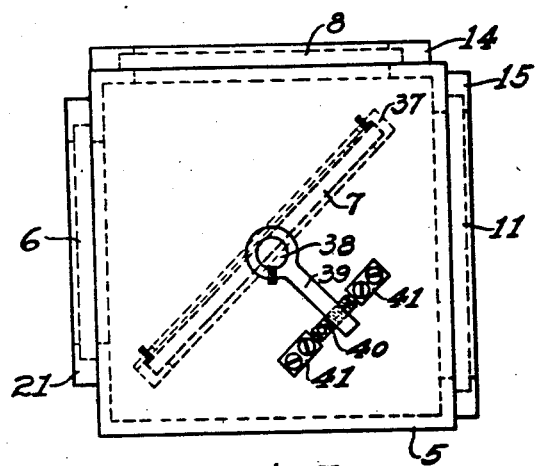
Figure 8:
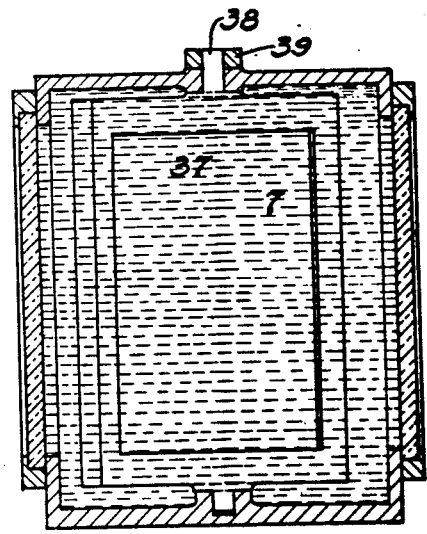

In the drawing, Figure 1 is a horizontal section through the splitting mirror mounted in a camera which is shown diagrammatically. Fig. 2 is a vertical section of the same. Fig. 3 is an elevation of the splitting mirror. Fig. 4 is a plan view of the mirror and holder. Fig. 5 is a section through the filling device. Fig. 6 is a sectional plan view of a three color camera. Figs. 7 and 8 are a plan view and a vertical section, respectively, of a modified type of cube.

Lens 1 and shutter 2 are mounted adjustably on the camera box 3 and connected to it by bellows 4. Light rays projected by the lens pass through the glass side 6 of the cube 5, the light rays passing through the liquid and striking the splitting mirror 7 mounted at an angle to the light rays (shown as forty-five degrees). This mirror is coated on its front or rear surface with bands of silver or other highly reflective substance as shown in Fig. 3, the silver being in strips, squares, rounds, or any other pattern. The light rays striking the silvered portions are reflected through the liquid and glass plate 8 and color filter 9 onto the sensitized emulsion 10 on the plate or film. The light rays striking the clear or unsilvered portions pass through the glass mirror 7, the liquid, glass plates 11 and the filter 12, and act on the emulsion on plate or film 18.

The cube 5 (so-called, though it usually is higher than wide) may be constructed in any way desired providing three of its sides are made of glass or other highly transparent material. It is not essential that it be shaped as a cube or even that the glass plates be the same distance from the point of intersection of the axial ray and the reflecting surface of the mirror. As illustrated, it consists of a cube with three sides open. Two of these sides are covered by the glass plates 8 and 11 held in place by the rim flanges 14 and 15, attached to the cube. Packing of any suitable material is placed between the rim flange and the glass and between the rim flange and the cube to prevent the leakage of any of the liquid in the cube. On the side of the cube toward the lens is a flange 16, open at the center, and having two projections 17, 17 (the ends of which are finished to form the angle at which the splitting mirror is to be mounted) which by means of lugs 18, 18 are arranged to hold the splitting mirror in place. The inner side 19 of the flange 16 is arranged to fit against the cube, while the other side 20 (preferably parallel to face 19) is adapted to receive the glass plate 6 held in place by rim flange 21 and made tight by the same form of packing. The two glass sides of the cube are preferably parallel to their respective plates (that is, the light-sensitive plates which are to receive the light rays) and at right angles to each other while the glass plate toward the lens is preferably parallel to the plate receiving the rays which are transmitted through instead of reflected by the light-splitting mirror or mirrors. It is preferable (though not essential) that the optical path of the reflected and transmitted rays be the same to the outside of glasses 8 and 11.

A stub shaft 42 projects from the base of the cube 5 and is adapted to a hole in the base 3 its center being directly below the point of intersection of the axial ray and the splitting surface of the mirror so that rotating the cube will shift the image evenly on the reflected plate and insure the setting of the mirror exactly to its predetermined angle.

The cube is filled with a liquid having an index of refraction of about the same as glass used in the splitting mirror—such liquids as glycerin, castor oil, mineral oil, carbon bisulfid, or glycerin and water containing a lead salt such as the nitrate or acetate. The glass in plates 6, 8 and 11 should be free from striæ or strain and be very nearly parallel on the two surfaces.

It is desirable to have a very small amount of air or other gas in the cube to allow for expansion of the fluid due to heat and as the cameras are frequently turned on their sides it is advisable to have an air trap 22 such as is shown in Fig. 5 used which is tapped into the top of the cube (preferably designed with a conical top) and which consists of the coiled tube 25 in connection with the liquid in the cube. The cube is then filled through filler 23 until the liquid runs out of the coiled pipe 25 showing the cube and coil full of liquid and free from air, the filler 23 is then sealed by cap 24 and the cap 26 is put on the air trap, leaving the space in the trap full of air. Expansion or contraction of the liquid in the cube can only change the level of the fluid in the coil pipe and no air at any time can get into the cube where it might badly interfere with the image.

If the refractive index of the fluid be very near that of the glass used in the mirror the glass may be silvered on its rear face, as there will be no image reflected from its front surface.

The three-color camera shown in Fig. 6 is similar to the two-color except that the "cube" contains another mirror 31 adapted to be partly silvered and consequently reflect part of the light transmitted through the first mirror 7 and also transmit a portion. The transmitted light passes through the mirror 31, the liquid, the plate 11, and filter 29, onto emulsion 30; while the reflected rays pass through glass plate 32, filler 35, and act on emulsion 36. The mirror 31 is supported by the projections on the flange 32 to which the glass plate is secured by the rim-flange 34.

The red filter may be placed at 27 and a red sensitive or panchromatic plate at 28 and the green filter at 35 and a green sensitive or panchromatic plate at 36, while the transmitted light may pass through blue filter 29 and act on the blue sensitive plate.

In the type of cube illustrated in Figs. 7 and 8 the mirror 7 may be mounted in the cradle 37 which is provided on both ends with stub shafts or trunnions 38, 38, adapted to turn in holes bored out in the top and bottom of the cube. The cradle is adapted to be slightly rotated by means of arm 39 attached to stub shaft 38 which is tapped out to receive the capstan screw 40 operating between stops 41, 41.

The object of providing this swinging adjustment of the mirror is to enable any error in manufacture to be corrected so that the mirror can be set finally exactly as desired.

In place of silvering the mirror in strips or geometric designs it may be partially silvered so as to reflect a portion of the light and transmit a portion, or platinum or any other suitable material may be used for the purpose. The silver or other material on either face may be protected from the action of the fluid used by coating with a protective transparent substance of much the same index of refraction, such as Canada balsam, celluloid, or other substance, depending largely on the refractive index of the glass used in the splitting mirror.

It is to be understood that the invention is not limited to the construction herein specifically illustrated and described, but can be embodied in other forms without departure from its spirit.

What I claim is:

1. A light splitting device comprising a receptacle constructed with a plurality of glass sides, one or more partly transparent glass mirrors mounted in the receptacle, and a suitable fluid in the receptacle having substantially the same index of refraction as the glass of said mirror or mirrors.

2. A light splitting device comprising a receptacle constructed with a plurality of glass sides, one or more mirrors having reflecting and transmitting parts mounted in the receptacle and a liquid in the said receptacle of approximately the same index of refraction as the said glass mirrors.

3. A light splitting device comprising a receptacle constructed with a plurality of glass sides, one or more mirrors having reflecting and transmitting parts mounted in the receptacle at an angle of forty five degrees with the respective side through which it is adapted to project an image, and a suitable fluid in the receptacle having substantially the same index of refraction as the glass of said mirror or mirrors.

4. A light splitting device comprising a receptacle constructed with a plurality of glass sides, one or more glass mirrors mounted in the receptacle adapted to reflect a portion of the light striking them and to transmit a portion, and a suitable liquid in the receptacle having substantially the same index of refraction as the glass of said mirror or mirrors.

5. A light splitting device comprising a receptacle constructed with a plurality of glass sides, one or more glass mirrors mounted in the receptacle, one surface of the mirrors being partly coated with a highly reflective substance, and a suitable liquid in the receptacle having substantially the same the same index of refraction as the glass of said mirror or mirrors.

6. A light splitting device comprising a receptacle constructed with a plurality of glass sides, one or more glass mirrors mounted in the said receptacle, the mirrors have one of their surfaces coated in spots with silver, and a suitable liquid in the said receptacle having substantially the same index of refraction as the glass of said mirror or mirrors.

7. A light splitting device comprising a receptacle constructed with a plurality of glass sides, one or more glass mirrors mounted in the said receptacle, a suitable liquid in the receptacle having substantially the same index of refraction as the glass composing the said mirror or mirrors, the mirrors having one of their surfaces coated in spots with silver and protected by a coating of some substance of about the same index of refraction as the glass mirrors and insoluble in the liquid used in the receptacle.

8. A light splitting device comprising a receptacle constructed with two glass plates opposite each other, a third glass side between the two said sides, a partly reflecting mirror in the said receptacle mounted at an angle of forty five degrees with the said third side, and a suitable liquid in the receptacle having substantially the same index of refraction as the glass of said mirror or mirrors.

9. A light splitting device comprising a receptacle constructed with two glass plates on opposite sides, two other glass plates between the said plates, preferably on opposite sides and staggered in relation to each other, two semi-reflecting mirrors mounted in the receptacle, each at an angle of forty-five degrees respectively to the glass plate through which it is adapted to project its image, and a suitable liquid in the receptacle having substantially the same index of refraction as the glass of said mirror or mirrors.

10. A light splitting device comprising a receptacle constructed with a plurality of glass sides, one or more glass mirrors having reflecting and transmitting parts mounted in the receptacle, a suitable liquid in the receptacle having substantially the same index of refraction as the glass composing the said mirror or mirrors, and means to permit of the expansion and contraction of the liquid in the receptacle.

In testimony whereof I hereunto affix my signature.

PERCY D. BREWSTER.